Aug. 24, 1965 E. J. KOCHER 3,201,949
REFRIGERATING APPARATUS WITH OIL SEPARATOR MEANS
Filed Aug. 22, 1963
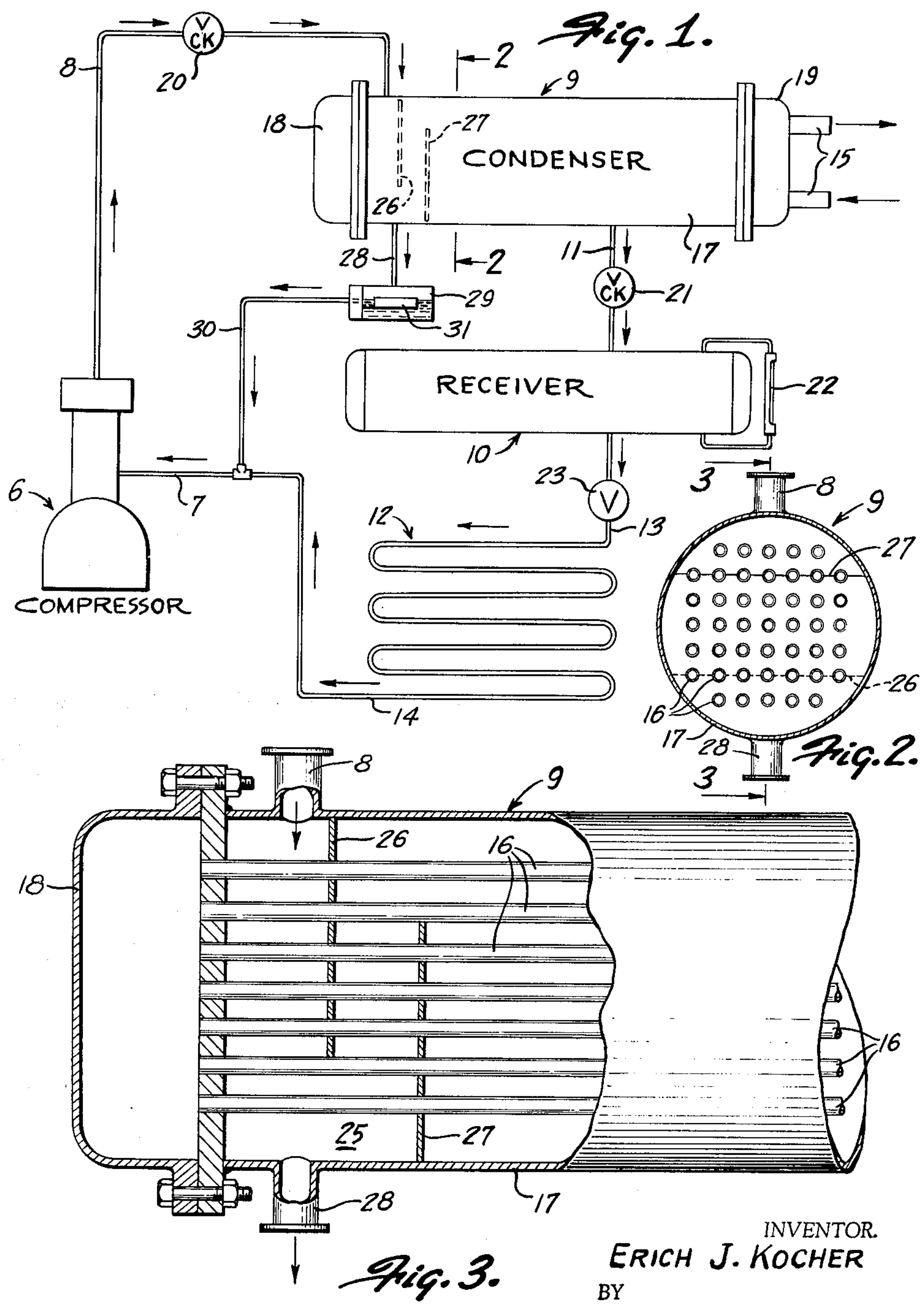
INVENTOR.
ERICH J. KOCHER
BY
Lieber & Nilles
ATTORNEYS United States Patent Office 3,201,949
Patented Aug. 24, 1965

3,201,949
REFRIGERATING APPARATUS WITH OIL SEPARATOR MEANS

Erich J. Kocher, Milwaukee, Wis., assignor to Vilter Manufacturing Corporation, Milwaukee, Wis., a corporation of Wisconsin Filed Aug. 22, 1963, Ser. No. 303,802
3 Claims. (Cl. 62—192)

The present invention relates generally to improvements in the art of refrigeration, and relates more particularly to the provision of a refrigerating system and apparatus embodying improved instrumentalities for separating oil from refrigerant being discharged from the compressor.

A primary object of the invention is to provide an improved oil separator embodied as an integral part of the condenser in a refrigerating system and which is extremely simple in construction and highly efficient in operation.

It is an accepted fact that qualities of oil used for the lubrication of compressors in refrigeration systems become mixed with the gaseous refrigerant being compressed and discharged under pressure through the system. The presence of such oil in the refrigerant is objectionable, and it has become common practice to provide diverse types of oil separators in attempts to remove the same.

In most instances in the past, these oil separators have consisted of a separate device interposed in the refrigerant line on the high pressure side of the compressor. However, these prior separators have been relatively ineffectual and also objectionably add to the expense of the refrigerating system as well as to the space requirements.

While the oil separators heretofore proposed have generally been located in the compressor discharge line in advance of the usual condenser, it has also been previously proposed to cool the refrigerant along with the entrained oil and to then separate the oil from the refrigerant before it passes the expansion valve. However, in most of these instances, the oil separator has again been in the form of a separate component, and furthermore, it has been found that failure to remove the oil at an earlier stage in the system is likely to cause trouble in that the oil tends to coat or form a non-conductive film on the heat transfer tubes or pipes.

It is therefore another important object of this invention to provide improvements in oil separation in refrigerating systems which obviates all of the aforementioned objections and disadvantages of prior systems and devices.

Another object of the invention is to provide an improved refrigeration condenser of the shell and tube type with novel and effective oil separating means at its high pressure inlet end for separating oil entrained with the refrigerant and confining the separated oil to the inlet end of the condenser.

Still another object of the present invention is to provide an improved oil separating condenser for refrigerating systems which is provided with a spaced series of oppositely directed baffles at its high pressure inlet end for effecting separation of entrained oil from the vapor discharged from the compressor to the condenser, the oil separation being effected by impingement of the discharge gas or vapor against the baffles augmented by the cooling effect of the condenser tubes.

A further object of the invention is to provide a shell and tube type condenser having an oil separating section at one end thereof formed by a series of spaced oppositely directed baffles forming a circuitous path for the gaseous refrigerant passing through the condenser, the end baffle extending upwardly from the bottom of the condenser shell to provide a dam confining the separated oil and conduit means being provided between the confined area and an oil reservoir.

These and additional objects and advantages of the invention will become apparent from the following detailed description.

A clear conception of the several features constituting the present improvements and of the construction and mode of operation of a typical shell and tube condenser embodying the invention and of a typical refrigerating system utilizing the improved condenser may be had by referring to the drawing accompanying and forming a part of this specification wherein like reference characters represent the same or similar parts in the various views.

FIG. 1 is a diagrammatic view illustrating the components of a typical refrigerating system embodying the invention;

FIG. 2 is a somewhat enlarged transverse section through the oil separating condenser of the system taken along the line 2—2 of FIG. 1; and FIG. 3 is a further enlarged fragmentary and part-sectional view of the condenser, the section being taken through the oil separating portion of the condenser along the line 3—3 of FIG. 2

While the invention has been shown and described herein as being especially advantageously embodied in a shell and tube condenser of a particular construction and utilized in a refrigerating system employing certain components, it is not desired to thereby unnecessarily restrict the invention or to limit its use; and it is also contemplated that certain descriptive terminology used herein shall be given the broadest possible interpretation consistent with the disclosure.

Referring to the drawing, the typical refrigerating system shown therein as embodying the invention comprises, in general, a compressor 6 having an inlet or suction conduit 7 leading thereto and an outlet or high pressure discharge conduit 8 leading therefrom; a condenser 9 disposed in the high pressure discharge line 8; a receiver 10 communicating with the condenser 9 through a conduit 11; and an evaporator or cooling coil 12 having its inlet end 13 in communication with the receiver 10 and its outlet end 14 in communication with the compressor by way of the suction conduit 7.

The compressor 6 may be of a conventional refrigeration type, and the condenser 9 is of the so-called shell and tube type in which cooling water supplied via conduit connections 15 is circulated through a plurality of tubes 16 traversing the shell 17 between the end heads 18, 19. The usual one-way non-return check valve 20 is interposed in the discharge line 8 between the compressor 6 and the condenser 9, and a check valve 21 may likewise be employed in the gravity feed line 11 between the condenser 9 and receiver 10. The receiver 10 is also provided with the customary liquid level indicating gauge 22, and the usual expansion valve 23 is provided in the inlet 13 to the cooling coil 12.

In accordance with this invention, the shell and tube condenser 9 is provided with an oil separating section 25 at its inlet end, such oil separating section being formed by a plurality of spaced baffles 26, 27 providing a circuitous path of travel for the oil-containing refrigerant discharged by the compressor. The baffles 26, 27 extend into and partially transversely across the condenser 9 in opposite directions with the end baffle 27 on the downstream side extending upwardly from the bottom of the shell 17 to form a dam preventing flow of liquid condensate past the baffle 27 in either direction. The baffle 27 thus segregates the oil separating section 25 from the remainder of the condenser shell insofar as liquid flow is concerned, and the section 25 is placed in communication with an oil reservoir 29 by means of a conduit 28 permitting liquid flow by gravity to the oil reservoir 29. The oil reservoir is, in turn, in communication with the suction line 7 of the compressor via conduit 30 past a float valve 31 which opens and closes dependent upon the liquid level in the chamber or reservoir 29.

Accordingly, refrigerant gas or vapor discharging under high pressure from the compressor 6 enters the end section 25 of the condenser shell 17 on the upstream side of the depending baffle 26 and is caused to impinge upon the baffle while being directed downwardly about the cooling tubes 16. As the vapor advances through the condenser 9, it impinges upon the upwardly projecting baffle 27 and is caused to move in an upward direction about the cooling tubes 16 before leaving the section 25 and entering the main body of the shell 17. Thus, by reason of the impingement of the refrigerant vapor and entrained oil upon the baffles and the prolonged period of cooling afforded by the travel of the vapor in its circuitous path about the tubes 16 within the section 25, the entrained oil is caused to effectively separate from the vapor in this section and such separated oil is confined to the section 25 by the baffle 27.

It is noteworthy that some refrigerant also condenses in the section 25, and this condensed refrigerant and oil flows by gravity to the float chamber or reservoir 29 from which the valve 31 controls its return to the compressor through the conduit 30 and suction line 7. In the suction line, the liquid evaporates to desuperheat the suction vapors, and during this cycle, the relatively oil-free vapor advancing to the downstream end of the condenser is condensed and conducted to the receiver 10 from which it flows to the evaporator or cooling coils 12 in the customary manner.

Various modes of carrying out the invention are contemplated as being within the scope of the following claims particularly pointing out and distinctly claiming the subject matter which is regarded as the invention.

I claim:

1. In a refrigerating system, a compressor having a low pressure inlet and a high pressure outlet, a condenser having an inlet section communicating with the high pressure outlet of said compressor, said inlet section being segregated from the remainder of the condenser by a baffle extending upwardly from the bottom and transversely across said condenser to form a dam restricting liquid flow, a receiver communicating with said condenser remote from the inlet section thereof downstream of said baffle for receiving condensed refrigerant therefrom, an evaporator communicating at one end with said receiver for receiving condensed refrigerant therefrom, said evaporator having the other end thereof communicating with the low pressure inlet of said compressor via a suction line, and conduit means between the lower portion of the segregated inlet section of said condenser and the suction line between the low pressure inlet of said compressor and said evaporator for returning oil and quantities of refrigerant from said condenser inlet section to said suction line and back to said compressor.

2. A refrigerating system according to claim 1, wherein the condenser has a plurality of spaced tubes therein for circulating coolant in a closed circuit, and means in the inlet section of the condenser upstream of the dam forming baffle for causing the incoming vapors to follow a circuitous path about said tubes.

3. A refrigerating system according to claim 1, wherein a chamber having a float controlled valve therein is interposed in the conduit between the segregated inlet section of the condenser and the suction line to the low pressure inlet of the compressor for feeding liquid through said conduit.

References Cited by the Examiner

UNITED STATES PATENTS

| | | | |
|---|---|---|---|
| 2,392,638 | 1/46 | Bowman | 165—111 |
| 2,595,822 | 5/52 | Uggerby | 165—159 |
| 2,709,340 | 5/55 | Webber | 62—473 |
| 2,921,448 | 1/60 | Carraway | 62—473 |

ROBERT A. O'LEARY, *Primary Examiner.*

MEYER PERLIN, *Examiner.*